United States Patent
Liu et al.

(10) Patent No.: US 11,022,840 B2
(45) Date of Patent: Jun. 1, 2021

(54) DISPLAYS WITH DIRECT-LIT BACKLIGHT UNITS

(71) Applicant: Apple Inc., Cupertino, CA (US)

(72) Inventors: Rong Liu, Sunnyvale, CA (US); Yu P. Sun, San Jose, CA (US); Abdeslam Hafidi, Cupertino, CA (US); Erik A. Zweigle, San Jose, CA (US); Jun Qi, Cupertino, CA (US); Mingxia Gu, San Jose, CA (US); Victor H. Yin, Cupertino, CA (US); Xiangtong Li, Fremont, CA (US); Yanming Li, Santa Clara, CA (US); Yi Huang, Santa Clara, CA (US); Ziruo Hong, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 17 days.

(21) Appl. No.: 16/409,567

(22) Filed: May 10, 2019

(65) Prior Publication Data

US 2019/0265548 A1    Aug. 29, 2019

Related U.S. Application Data

(63) Continuation of application No. PCT/US2018/015776, filed on Jan. 29, 2018, which
(Continued)

(51) Int. Cl.
G02F 1/1335         (2006.01)
G02F 1/13357        (2006.01)

(52) U.S. Cl.
CPC .... G02F 1/133605 (2013.01); G02F 1/13362 (2013.01); G02F 1/133603 (2013.01);
(Continued)

(58) Field of Classification Search
CPC ... G02F 2001/133614; G02F 1/133605; G02F 1/133603; G02F 1/133606; G02F 1/133611; G02F 1/13362; G02F 1/133614
See application file for complete search history.

(56) References Cited

U.S. PATENT DOCUMENTS 6,531,230 B1 *  3/2003  Weber ............... B32B 7/02
                                                   428/480
6,871,982 B2 *  3/2005  Holman ............ G02B 5/045
                                                   257/E33.072

(Continued)

FOREIGN PATENT DOCUMENTS

CN      101034225 A     9/2007
CN      101086577 A    12/2007
(Continued)

OTHER PUBLICATIONS

Che-Ming Chang et al., A new design mixing RGB LED (red, green, blue light-emitting diode) for a modern LCD (liquid crystal display) backlight system, Proceedings of Spie, 12 pages, Sep. 12, 2006, retrieved from the Internet: <URL: http://SPIEDigitalLibrary.org/Conference-proceedings-of-spie>.

*Primary Examiner* — Arman B Fallahkhair
(74) *Attorney, Agent, or Firm* — Treyz Law Group, P.C.; G. Victor Treyz; David K. Cole

(57) ABSTRACT

An array of pixels in a display may be illuminated by a backlight having an array of light-emitting diodes in an array of respective cells. A reflector is used to reflect light from the light-emitting diodes through the array of pixels. Within the cells, the reflector has cross-sectional profiles that help distribute light emitted from the light-emitting diodes toward edges of the cells. A light diffuser layer for the backlight may have a partially reflective layer such as a thin-film interference filter with an angularly dependent transmission. Within each cell, the reflector may have cross-
(Continued)

sectional profiles with portions that are parabolic or elliptical.

25 Claims, 14 Drawing Sheets

Related U.S. Application Data is a continuation of application No. 15/819,085, filed on Nov. 21, 2017, now abandoned.

(60) Provisional application No. 62/466,492, filed on Mar. 3, 2017.

(52) U.S. Cl.
CPC .. *G02F 1/133606* (2013.01); *G02F 1/133611* (2013.01); *G02F 1/133607* (2021.01); *G02F 1/133612* (2021.01); *G02F 1/133614* (2021.01)

(56) References Cited

U.S. PATENT DOCUMENTS

| | | | |
|---|---|---|---|
| 7,220,044 B2 | 5/2007 | Hong et al. | |
| 7,520,642 B2* | 4/2009 | Holman | G02B 5/045 |
| | | | 349/61 |
| 8,449,128 B2* | 5/2013 | Ko | G02B 19/0066 |
| | | | 362/84 |
| 9,086,594 B2 | 7/2015 | Ogi et al. | |
| 10,458,622 B2* | 10/2019 | Nakamura | G02B 5/09 |
| 2004/0218390 A1 | 11/2004 | Holman et al. | |
| 2005/0012076 A1* | 1/2005 | Morioka | C09K 11/02 |
| | | | 252/301.4 R |
| 2006/0215075 A1* | 9/2006 | Huang | G02F 1/133603 |
| | | | 349/67 |
| 2007/0014318 A1* | 1/2007 | Hajjar | B82Y 10/00 |
| | | | 372/9 |
| 2007/0236628 A1* | 10/2007 | Epstein | G02B 5/0242 |
| | | | 349/67 |
| 2015/0097198 A1 | 4/2015 | Illek | |
| 2016/0091151 A1* | 3/2016 | Itoi | G02B 6/0073 |
| | | | 362/612 |
| 2017/0108726 A1* | 4/2017 | Yanai | G02F 1/13362 |

FOREIGN PATENT DOCUMENTS

| | | |
|---|---|---|
| CN | 201177708 Y | 1/2009 |
| CN | 201787427 U | 4/2011 |
| CN | 203223802 U | 10/2013 |
| CN | 104155800 A | 11/2014 |
| CN | 105353557 A | 2/2016 |
| CN | 205103524 U | 3/2016 |
| CN | 208092384 U | 11/2018 |
| JP | H11-266035 A | 9/1999 |
| JP | 2006-520518 A | 9/2006 |
| JP | 2006267991 A | 10/2006 |
| JP | 2008503034 A | 1/2008 |
| JP | 2009140822 A | 6/2009 |
| JP | 2009289515 A | 12/2009 |
| JP | 2010-170961 A | 8/2010 |
| JP | 2011215548 A | 10/2011 |
| JP | 2013213932 A | 10/2013 |
| JP | 2014165062 A | 9/2014 |
| WO | 2004068182 | 8/2004 |
| WO | 2016143765 A1 | 9/2016 |
| WO | 2016196540 | 12/2016 |

* cited by examiner

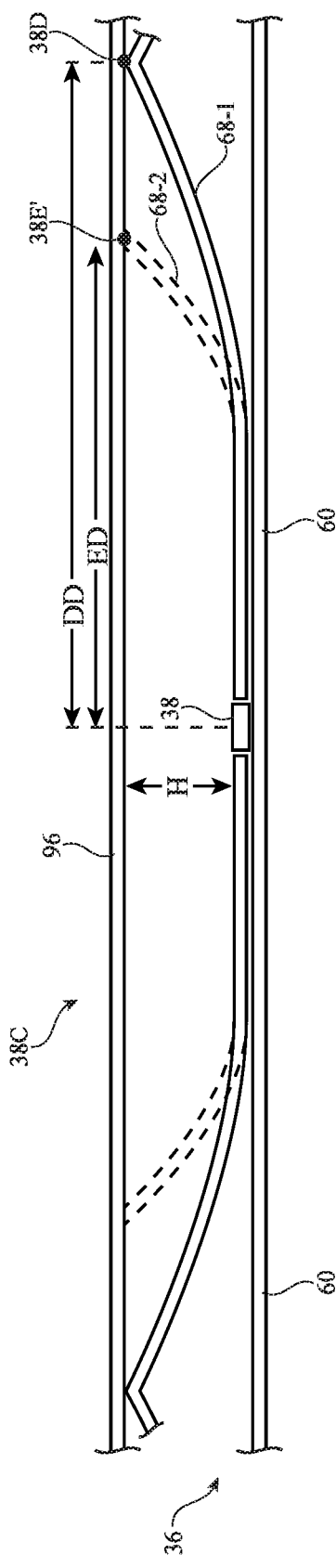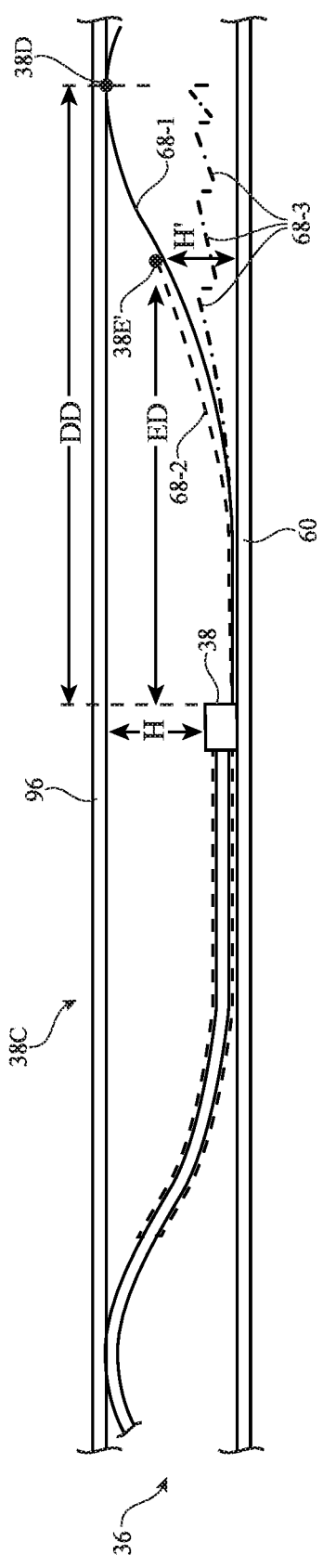

DISPLAYS WITH DIRECT-LIT BACKLIGHT UNITS

This application is a continuation of International Application PCT/US2018/015776, with an international filing date of Jan. 29, 2018, which claims priority to U.S. patent application Ser. No. 15/819,085, filed on Nov. 21, 2017, which claims the benefit of provisional patent application No. 62/466,492, filed on Mar. 3, 2017, which are hereby incorporated by reference herein in their entireties.

BACKGROUND

This relates generally to displays, and, more particularly, to backlit displays.

Electronic devices often include displays. For example, computers and cellular telephones are sometimes provided with backlit liquid crystal displays. Edge-lit backlight units have light-emitting diodes that emit light into an edge surface of a light guide plate. The light guide plate then distributes the emitted light laterally across the display to serve as backlight illumination. Direct-lit backlight units have arrays of light-emitting diodes that emit light vertically through the display.

Direct-lit backlights may have locally dimmable light-emitting diodes that allow dynamic range to be enhanced. If care is not taken, however, a direct-lit backlight may be bulky or may produce non-uniform backlight illumination.

SUMMARY

A display may have a pixel array such as a liquid crystal pixel array. The pixel array may be illuminated with backlight illumination from a backlight unit. The backlight unit may include an array of light-emitting diodes and a light reflector that helps reflect light from the light-emitting diodes through the pixel array. Each light-emitting diode may be placed in a respective cell. In each cell, the light reflector may have a cross-sectional profile that includes a parabolic or elliptical portion.

A diffuser in the display may be used to homogenize light from the array of light-emitting diodes. A phosphorescent layer and other optical films may overlap the diffuser.

The light-emitting diodes may be blue light-emitting diodes. A partially reflective layer may be interposed between the diffuser and the array of light-emitting diodes. The partially reflective layer may be formed from a stack of dielectric layers on the diffuser. The stack of dielectric layers may form a thin-film interference filter with an angularly dependent transmission.

The light-emitting diodes may be mounted to a printed circuit and may protrude through openings in the light reflector. The light reflector may be formed from a reflective material such as reflective white layer or a dielectric stack forming a thin-film interference mirror.

BRIEF DESCRIPTION OF THE DRAWINGS

FIG. 10 is a cross-sectional side view of an illustrative cavity reflector of the type shown in FIG. 7 in accordance with an embodiment.

FIG. 11 a cross-sectional side view of an illustrative cavity reflector of the type shown in FIG. 8 in accordance with an embodiment.

DETAILED DESCRIPTION

Figure 1:
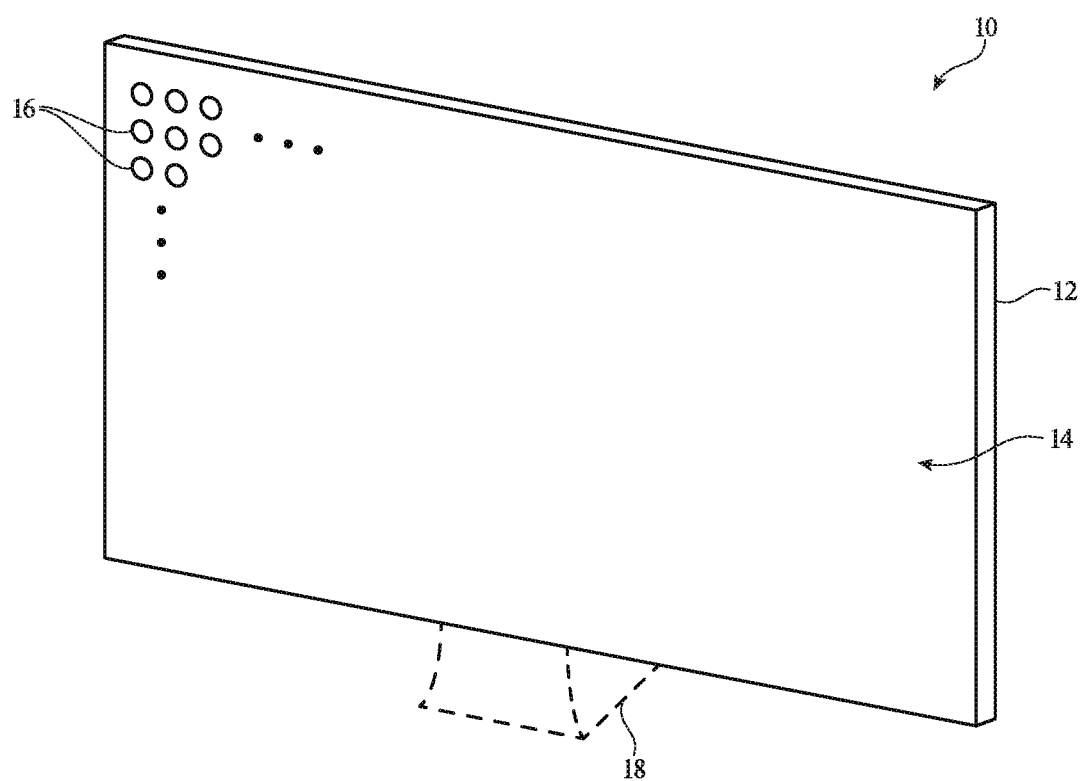
FIG. 1 is a diagram of an illustrative electronic device having a display in accordance with an embodiment.

Electronic devices may be provided with backlit displays. The backlit displays may include liquid crystal pixel arrays or other display structures that are backlit by light from a direct-lit backlight unit. A perspective view of an illustrative electronic device of the type that may be provided with a display having a direct-lit backlight unit is shown in FIG. 1. Electronic device 10 of FIG. 1 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment.

As shown in FIG. 1, device 10 may have a display such as display 14. Display 14 may be mounted in housing 12. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.).

Housing 12 may have a stand such as optional stand 18, may have multiple parts (e.g., housing portions that move relative to each other to form a laptop computer or other device with movable parts), may have the shape of a cellular telephone or tablet computer (e.g., in arrangements in which stand 18 is omitted), and/or may have other suitable configurations. The arrangement for housing 12 that is shown in FIG. 1 is illustrative.

Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures.

Display 14 may include an array of pixels 16 formed from liquid crystal display (LCD) components or may have an array of pixels based on other display technologies. A cross-sectional side view of display 14 is shown in FIG. 2.

Figure 2:
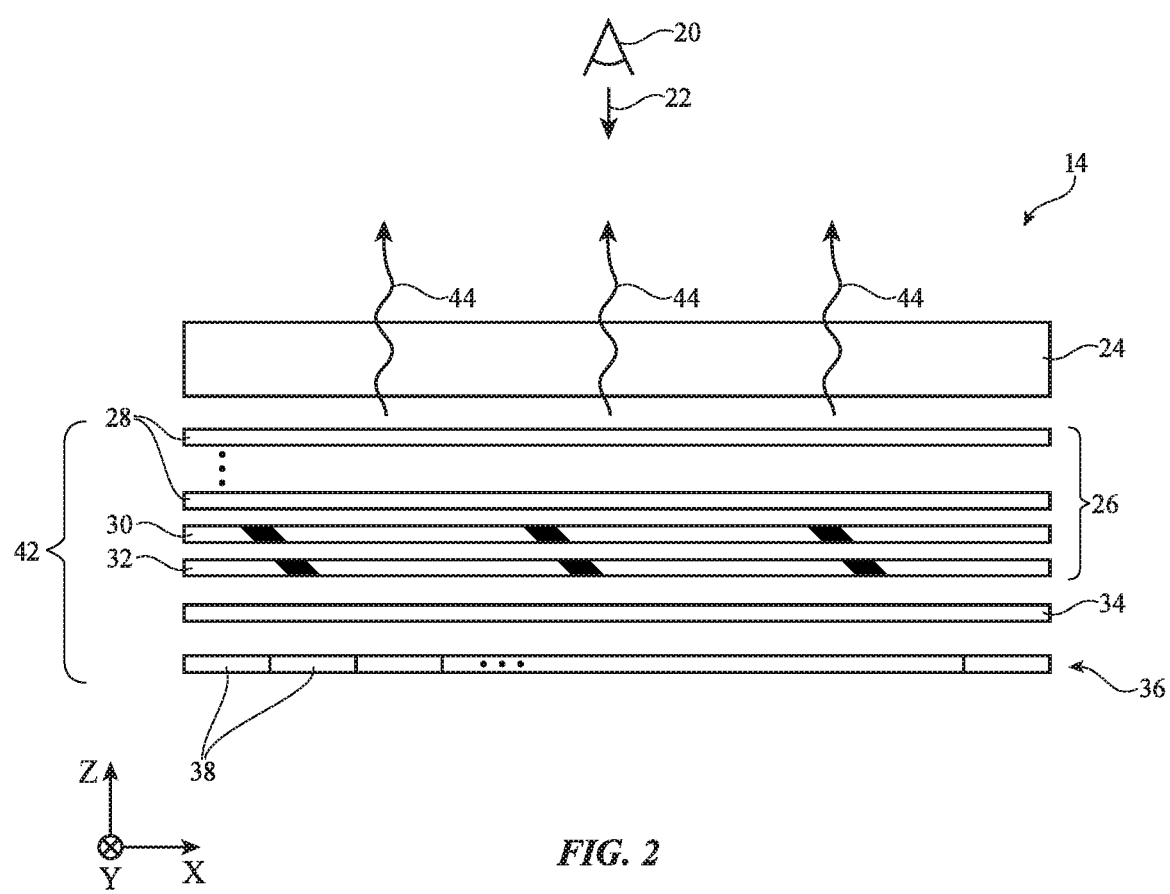
FIG. 2 is a cross-sectional side view of an illustrative display in accordance with an embodiment.

As shown in FIG. 2, display 14 may include a pixel array such as pixel array 24. Pixel array 24 may include an array of pixels such as pixels 16 of FIG. 1 (e.g., an array of pixels having rows and columns of pixels 16). Pixel array 24 may be formed from a liquid crystal display module (sometimes referred to as a liquid crystal display or liquid crystal layers) or other suitable pixel array structures. A liquid crystal display for forming pixel array 24 may, as an example, include upper and lower polarizers, a color filter layer and a thin-film transistor layer interposed between the upper and lower polarizers, and a layer of liquid crystal material interposed between the color filter layer and the thin-film transistor layer. Liquid crystal display structures of other types may be used in forming pixel array 24, if desired.

During operation of 14, images may be displayed on pixel array 24. Backlight unit 42 (which may sometimes be referred to as a backlight, backlight layers, backlight structures, a backlight module, a backlight system, etc.) may be used in producing backlight illumination 44 that passes through pixel array 24. This illuminates any images on pixel array 24 for viewing by a viewer such as viewer 20 who is viewing display 14 in direction 22.

Backlight unit 42 may have optical films 26, a light diffuser such as light diffuser (light diffuser layer) 34, and light-emitting diode array 36. Light-emitting diode array 36 may contain a two-dimensional array of light sources such as light-emitting diodes 38 that produce backlight illumination 44. Light-emitting diodes 38 may, as an example, be arranged in rows and columns and may lie in the X-Y plane of FIG. 2.

Light-emitting diodes 38 may be controlled in unison by control circuitry in device 10 or may be individually controlled (e.g., to implement a local dimming scheme that helps improve the dynamic range of images displayed on pixel array 24). The light produced by each light-emitting diode 38 may travel upwardly along dimension Z through light diffuser 34 and optical films 26 before passing through pixel array 24. Light diffuser 34 may contain light-scattering structures that diffuse the light from light-emitting diode array 36 and thereby help provide uniform backlight illumination 44. Optical films 26 may include films such as dichroic filter 32, phosphor layer 30, and films 28. Films 28 may include brightness enhancement films that help to collimate light 44 and thereby enhance the brightness of display 14 for user 20 and/or other optical films (e.g., compensation films, etc.).

Light-emitting diodes 38 may emit light of any suitable color. With one illustrative configuration, light-emitting diodes 38 emit blue light. Dichroic filter layer 32 may be configured to pass blue light from light-emitting diodes 38 while reflecting light at other colors. Blue light from light-emitting diodes 38 may be converted into white light by a photoluminescent material such as phosphor layer 30 (e.g., a layer of white phosphor material or other photoluminescent material that converts blue light into white light). If desired, other photoluminescent materials may be used to convert blue light to light of different colors (e.g., red light, green light, white light, etc.). For example, one layer 30 (which may sometimes be referred to as a photoluminescent layer or color conversion layer) may include quantum dots that convert blue light into red and green light (e.g., to produce white backlight illumination that includes, red, green, and blue components, etc.). Configurations in which light-emitting diodes 38 emit white light (e.g., so that layer 30 may be omitted, if desired) may also be used.

In configurations in which layer 30 emits white light such as white light produced by phosphorescent material in layer 30, white light that is emitted from layer 30 in the downwards (−Z) direction may be reflected back up through pixel array 24 as backlight illumination by dichroic filter layer 32 (i.e., layer 32 may help reflect backlight outwardly away from array 36). In configurations in which layer 30 includes, for example, red and green quantum dots, dichroic filter 32 may be configured to reflect red and green light from the red and green quantum dots, respectively to help reflect backlight outwardly away from array 36. By placing the photoluminescent material of backlight 42 (e.g., the material of layer 30) above diffuser layer 34, light-emitting diodes 38 may be configured to emit more light towards the edges of the light-emitting diode cells (tiles) of array 36 than at the centers of these cells, thereby helping enhance backlight illumination uniformity.

Figure 3:
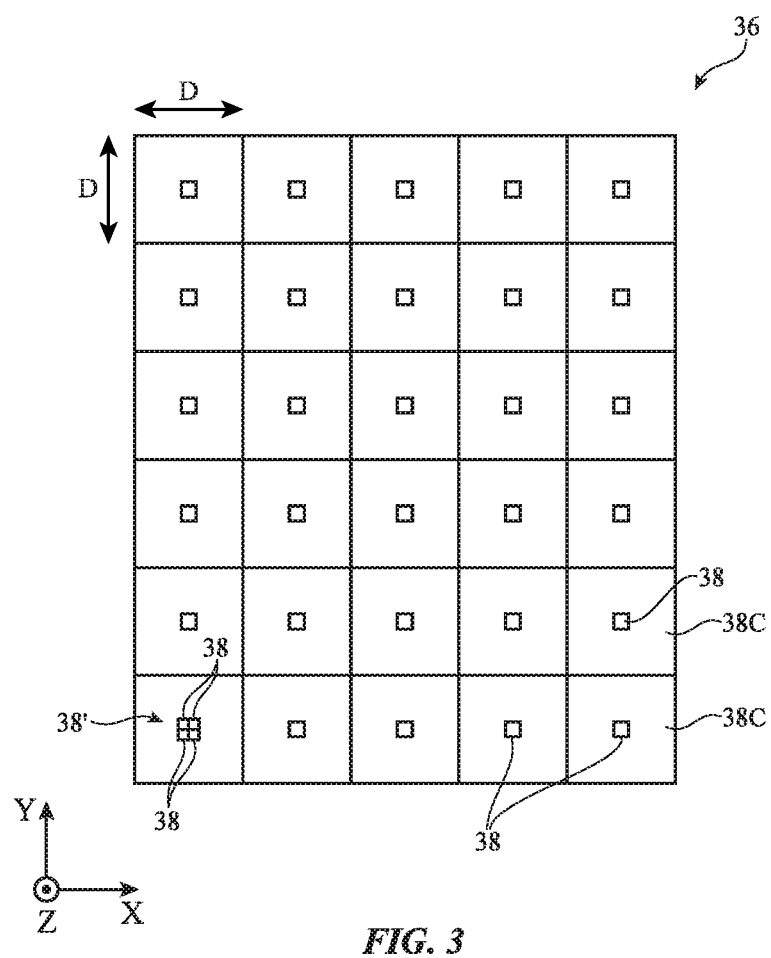
FIG. 3 is a top view of an illustrative light-emitting diode array for a direct-lit backlight unit in accordance with an embodiment.

FIG. 3 is a top view of an illustrative light-emitting diode array for backlight 42. As shown in FIG. 3, light-emitting diode array 36 may contain row and columns of light-emitting diodes 38. Each light-emitting diode 38 may be associated with a respective cell (tile area) 38C. The length D of the edges of cells 38C may be 2 mm, 18 mm, 1-10 mm, 1-4 mm, 10-30 mm, more than 5 mm, more than 10 mm, more than 15 mm, more than 20 mm, less than 25 mm, less than 20 mm, less than 15 mm, less than 10 mm, or other suitable size. If desired, hexagonally tiled arrays and arrays with light-emitting diodes 38 that are organized in other suitable array patterns may be used. In arrays with rectangular cells, each cell may have sides of equal length (e.g., each cell may have a square outline in which four equal-length cell edges surround a respective light-emitting diode) or each cells may have sides of different lengths (e.g., a non-square rectangular shape). The configuration of FIG. 3 in which light-emitting diode array 36 has rows and columns of square light-emitting diode regions such as cells 38C is merely illustrative.

If desired, each cell 38C may have a light source that is formed form an array of light-emitting diode dies (e.g., multiple individual light-emitting diodes 38 arranged in an array such as a 2×2 cluster of light-emitting diodes at the center of each cell 38C). For example, light source 38' in the leftmost and lowermost cell 38C of FIG. 3 has been formed from a 2×2 array of light-emitting diodes 38 (e.g., four separate light-emitting diode dies). The diodes 38 in light source 38' may be mounted on a common package substrate, may be mounted on a printed circuit board substrate that extends across array 36, or may be mounted in array 36 using other suitable arrangements. In general, each cell 38C may include a light source 38' with a single light-emitting diode 38, a pair of light-emitting diodes 38, 2-10 light-emitting diodes 38, at least two light-emitting diodes 38, at least 4 light-emitting diodes 38, at least eight light-emitting diodes 38, fewer than five light-emitting diodes 38, or other suitable number of light-emitting diodes. Illustrative configurations in which each cell 38C has a single light-emitting diode 38 may sometimes be described herein as an example. This is, however, merely illustrative. Each cell 38C may have a light source 38 with any suitable number of one or more light-emitting diodes 38.

Figure 4:
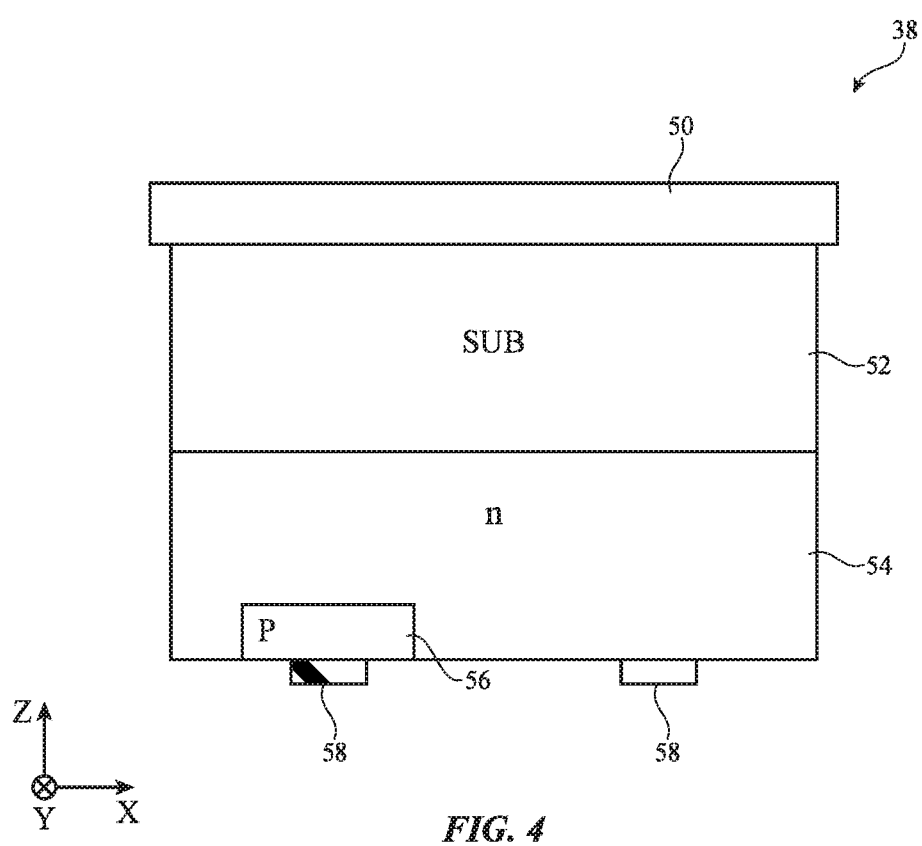
FIG. 4 is a cross-sectional side view of an illustrative light-emitting diode in accordance with an embodiment.

FIG. 4 is a cross-sectional side view of illustrative light-emitting diode. Light-emitting diodes such as light-emitting diode 38 of FIG. 4 may have terminals such as contacts 58. Contacts 58 may be electrically coupled to a printed circuit or other substrate with conductive material such as solder (e.g., so that light-emitting diodes 38 may be soldered or otherwise mounted in an array such as array 36 of FIG. 3). Light-emitting diode 38 may have n-type region 54 and p-type region 56. Regions 54 and 56 may be formed on substrate 52 from a crystalline semiconductor material such as gallium nitride. Substrate 52 may be formed from a transparent crystalline material such as sapphire or other suitable substrate material. Reflector layer 50 (e.g., a distributed Bragg reflector) may be formed on substrate 52 to help direct emitted light from diode 38 sideways.

Figure 5:
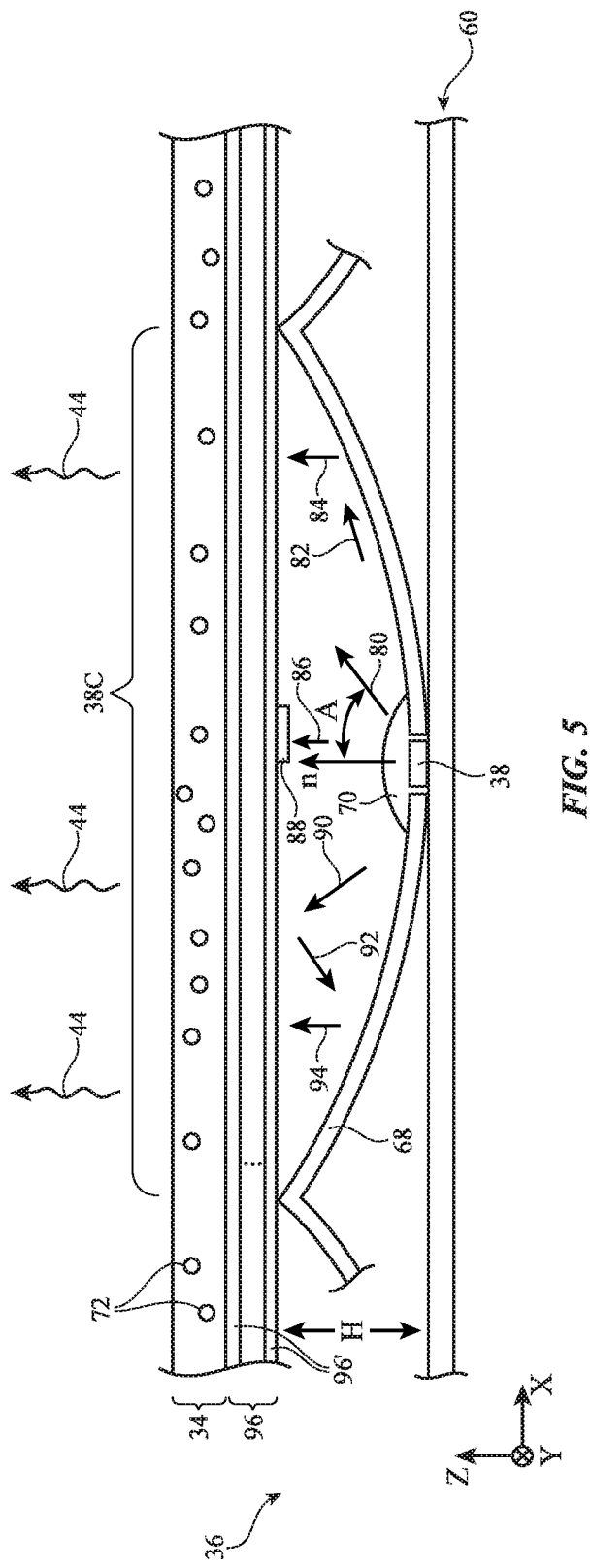
FIG. 5 is a cross-sectional side view of illustrative light-emitting diode in a cavity reflector showing how light may be emitted from the light-emitting diode at various angles in accordance with an embodiment.

FIG. 5 is a cross-sectional side view of an illustrative light-emitting diode cell. As shown in FIG. 5, each light-emitting diode cell (tile) 38C in light-emitting diode array 36 may have a reflector such as cavity reflector 68. Reflector 68 may have a square outline (i.e., a square footprint when viewed from above) or may have other suitable shapes and may be formed from sheet metal (e.g., stamped sheet metal), metallized polymer film, a thin-film metal on a plastic carrier, a dielectric thin-film stack that forms a dielectric mirror (a thin-film interference mirror) on a polymer film or molded plastic carrier, a white reflective film (e.g., a glossy white polymer sheet formed from a white ink layer or other white layer on a polymer carrier covered with a glossy coating such as a glossy polymer coating, a diffusively reflective white reflector, or a specularly reflective white reflector), or other suitable reflector structure. If desired, reflector 68 may be formed from a layer of cholesteric liquid crystals where Bragg reflectivity is controlled by material birefringence (refractive index difference) and pitch and can be singular or chirped for bandwidth control or may be an interference filter using a stack of layers with a sufficiently large index of refraction difference (e.g., n>0.1) between adjacent layers such as a stack of multiple polymer layers or layers of other materials. The stack of polymer layers may be, for example, a stack of alternating films of polyethylene terephthalate (PET) and polymethyl methacrylate (PMMA) or a stack of alternating films of polyethylene naphthalate (PEN) and PMMA. Light-emitting diode 38 may be soldered or otherwise mounted to metal traces in printed circuit 60. An opening in the center of reflector 68 may receive light-emitting diode 38. Cells in reflector 68 may have cross-sectional profiles with curved portions to help reflect light from diode 38 upwards as backlight illumination 44. With one illustrative configuration, a polymer film (e.g., a film coated with a dielectric thin-film interference mirror surface or a glossy white reflective surface) may be embossed using a roller (e.g., the film may be thermoformed using patterned structures on a heated roller). Following thermoforming operations to form the curved walls of reflector 68 in each cell 38C, a die cutting tool or other cutting apparatus may cut openings for each of light-emitting diodes 38.

As shown in FIG. 5, a transparent structure such as transparent dome structure 70 may be formed over light-emitting diode 38 to help laterally distribute light from light-emitting diode 38. Dome structure 70 may be formed from a bead of clear silicone or other transparent polymer (as an example). During operation, light-emitting diode 38 emits light that is refracted away from the Z axis by dome structure 70. Emitted light rays from light-emitting diode 38 such as ray 80, may be characterized by an angle A with respect to surface normal n of light-emitting diode 38. Light 80 that is traveling parallel to the Z dimension is parallel to surface normal n (angle A=0°). Light 80 that is traveling parallel to the X-Y plane is traveling perpendicular to the Z dimension and surface normal n (i.e., A=90°). Light 80 that is traveling at other angular orientations relative to surface normal n is characterized by an intermediate value of angle A.

Some rays of light 80 are oriented at relatively large angles A and are reflected upwardly in direction Z from reflector 68 (see, e.g., light ray 82 that reflects from reflector 68 as reflected light ray 84). Other rays of light 80 are oriented at smaller angles A. For example, light ray 90 is oriented at a smaller value of angle A with respect to surface normal n. An angularly dependent filter or other layer that is at least partially reflective such as layer 96 may be interposed between light diffuser 34 and light-emitting diodes 38 (and reflector 68) to help reflect at least some of vertical light rays (A=0°) or nearly vertical light rays at the center of cell 38C such as light ray 86 downwards while allowing more angled light rays (light rays that strike filter 96 at locations closer to the edges of cavity 38C) to pass to diffuser 34. For example, light rays such as light ray 90 may be reflected outwardly and downwardly (in the −Z direction) by layer 96 as shown by light ray 92 before being reflected back in the upwards (+Z) direction as shown by light ray 94.

Layer 96 may be formed from multiple dielectric layers 96' (e.g., layer 96 may be a thin-film interference filter formed from a dielectric stack with alternating high and low index-of-refraction materials formed from silicon oxide, silicon nitride, and/or other inorganic materials, layers of organic materials, and/or may be a layer formed from other dielectric materials and/or layers for forming a thin-film interference filter.). With one illustrative configuration, there are 5 layers 96', 3-6 layers 96', more than 3 layers 96', or fewer than 10 layers 96' in layer 96 (as examples). Configurations in which layer 96 is formed from one or more layers of reflective material (e.g., a single layer of bulk material or two or more layers of material, etc.) without forming a thin-film interference filter or in which layer 96 includes both one or more bulk coating layers and a thin-film interference filter formed from a stack of dielectric layers may also be used. If desired, partially reflective layer 96 may be formed from a layer of cholesteric liquid crystals where Bragg reflectivity is controlled by material birefringence (refractive index difference) and pitch and can be singular or chirped for bandwidth control or may be a bandpass interference filter using a stack of layers with a sufficiently large index of refraction difference (e.g., n>0.1) between adjacent layers such as a stack of multiple polymer layers or layers of other materials. The stack of polymer layers may be, for example, a stack of alternating films of polyethylene terephthalate (PET) and polymethyl methacrylate (PMMA) or a stack of alternating films of polyethylene naphthalate (PEN) and PMMA.

To help ensure that backlight 44 is uniform, light diffuser 34 and/or other structures in backlight 42 may be provided with optional light homogenizing structures. For example, a pattern of light blocking and reflecting structures such as structures 88 may be formed on the lower surface of layer 96. Structures 88 may include dots, rings, square pads, pseudorandom patterns of pads that reflect and block light, or other structures that are patterned to block more emitted light in the center of cell 38C than at the edges of cell 38C. Structures 88 may be formed from patterned ink, patterns of reflecting protrusions, a patterned angularly-dependent thin-film interference filter layer, and/or other light reflecting and light scattering structures that help reflect and/or absorb on-axis emitted light at the center of cells 38C while allowing light at the edges of cells 38C to be passed upwardly towards films 26. This helps reduce hotspots in the middle of cells 38C and smooths out light intensity variations that might otherwise arise as light from array 36 is diffused by light diffuser 34. Structures 88 may be formed on the lower (inner) surface of layer 96, may be formed on a separate substrate (e.g., a substrate that is also used to carry layer 96 and/or a substrate that is different from the substrate supporting layer 96), or may be formed at other suitable locations within backlight unit 42.

During operation, at least some of the light from light-emitting diode 38 that is emitted directly upwards in the center of cell 38C (e.g., light 86 of FIG. 5) will be reflected downwards by optional structure 88 and/or by layer 96. Reflected light will be spread out laterally (e.g., by reflecting from cavity reflector 68). Other light, such as light 82 that is emitted from light-emitting diode 38 sideways, may reflect off of cavity reflector 68 without reflecting off of structure 88 or layer 96 and will pass upwards through diffuser 34 to serve as backlight 44. Light 90 will reflect from layer 96 and reflector 68 before passing upwards as light 94.

By recycling light near the center of each cell 38C while allowing light near the edges of each cell 38C to pass directly through diffuser 34, the intensity of light near the edges of each cell 38C may be increased relative to the intensity of light near the center of each cell 38C. This helps ensure that backlight 44 will be uniform across the surface of light diffuser 34 and backlight 42. If desired, light-scattering particles 72 (e.g., microbeads, hollow microspheres, bubbles, and/or other light-scattering particles) may be embedded within a polymer or other material that forms diffuser layer 34 to help diffuse emitted light. Light-scattering particles 72 may have an index of refraction that differs from that of the polymer that makes up diffuser 34. For example, the refractive index of particles 72 may be larger than the refractive index of the polymer or other material that is used in forming layer 34 or may be lower than the refractive index of diffuser 34. Light-scattering features (e.g., bumps, ridges, and/or other protrusions, grooves, pits, or other depressions may be formed on the upper and/or lower surface of light diffuser 34 in addition to or instead of including light-scattering particles 72 in diffuser 34. In some configurations, light may be diffused using a photoluminescent layer in backlight unit 42 (e.g., photoluminescent layer 30, which may be formed from phosphors and/or quantum dots) in addition to or instead of diffuser 34.

In the illustrative configuration of FIG. 5, a single structure 88 (e.g., a single pad) has been provided above the light-emitting diode 38 in each cell 38C. If desired, a cluster of pads (circular pads, square pads, or pads of other shapes) may be formed above each light-emitting diode. The density of the pads in each cluster (e.g., the number of pads per unit area and/or the area consumed by the pads per unit area) may be varied as a function of position. For example, each pad cluster may have more pads and/or larger pads near the center of that pad cluster than near the edges of that pad cluster. The use of graded structures such as pad clusters with graded pad densities (e.g., pads concentrated over diodes 38) may help smoothly reduce hotspots in cells 38C. If desired, structures 88 may be omitted (e.g., in configurations in which layer 96, transparent dome structure 70, and/or other structures in backlight unit 42 are configured to homogenize emitted light without structures 88).

In the illustrative configuration of FIG. 5, a partially reflective layer (e.g., a thin metal layer, a stack of dielectric thin-film layers, one or more other partially reflective layers, etc.) such as layer 96 is provided between light diffuser 34 and light-emitting diodes 38. Layer 96 may be formed as a coating on the lower surface of diffuser 34, may be embedded in diffuser 34, and/or may be separate from diffuser 34. Light that is reflected downwardly from layer 96 may be reflected back in the upwards direction by cavity reflector 68. The presence of layer 96 thereby helps to enhance the number or reflections for each light ray and therefore enhances the homogenization of emitted light from light-emitting diode array 36 before this light passes through layer 34. If desired, additional diffusion may be provided by a diffusive coating on diffuser 34 and/or other layers in backlight unit 42 (e.g., a diffusive coating may be formed from a polymer layer on the upper surface of diffuser 34 with embedded light-scattering particles 72). The density of light-scattering particles 72 may, if desired, be graded.

In configurations in which partially reflective layer 96 is formed using a thin-film interference filter arrangement, layer 96 contains dielectric layers 96'. Layers 96' of layer 96 may be, for example, inorganic layers of differing refractive indices (e.g., alternating high and low index-of-refraction layers formed from materials such as aluminum oxide, silicon oxide, silicon nitride, titanium oxide, other metal oxides, nitrides, and/or oxynitrides, etc.). Layers 96' may be configured to form a thin-film interference filter in which the transmission spectrum of layer 96 varies as a function of angle of incidence. This causes the transmission T of light at a given wavelength λ such as wavelength λb of FIG. 6, which may be associated with the blue light emitted from diode 38, to vary depending on the angle-of-incidence of that light with respect to layer 96.

Figure 6:
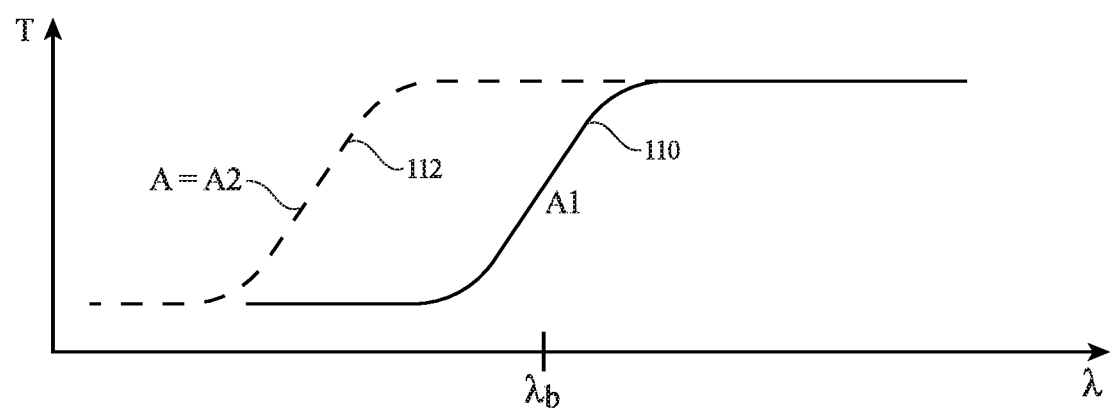
FIG. 6 is a graph showing how the light-emitting diodes and reflective layer of FIG. 5 may be overlapped by a layer with an angularly varying light transmittance in accordance with an embodiment.

As shown in FIG. 6, layer 96 may exhibit transmission spectrum 110 when exposed to light from diode 38 at angle A1 (e.g., close to 0° and parallel to surface normal n of FIG. 5) and may exhibit transmission spectrum 112 for light that is traveling at angles near angle A2 (e.g., 45°. Due to the variation in the transmission spectrum of layer 96 as a function of angle of incidence, blue light at λb will be at least partly reflected (e.g., transmission T will be less than a given amount) when characterized by an angle-of-incidence of A1 and will be less reflected (e.g., transmission T will be more than the given amount) when characterized by an angle-of-incidence of A2 or greater than A2 that is greater than A1. As the curves of FIG. 6 demonstrate, at least some of the blue light (e.g., light at wavelength λb) that is emitted from light-emitting diodes 38 in the center of cells 38C will be reflected and therefore recycled when emitted directly upwards (parallel to surface normal n), whereas blue light that is emitted at more oblique angles A will be allowed to pass when striking layer 96. This may help reduce hotspots for emitted light in the centers of cells 38C.

Hotspots may be further reduced by configuring the shape of reflector 68 in each cell 38C to help capture light that has been laterally spread outwards from light-emitting diode 38 at the center of each cell 38C towards the periphery of each cell 38C.

Figure 7:
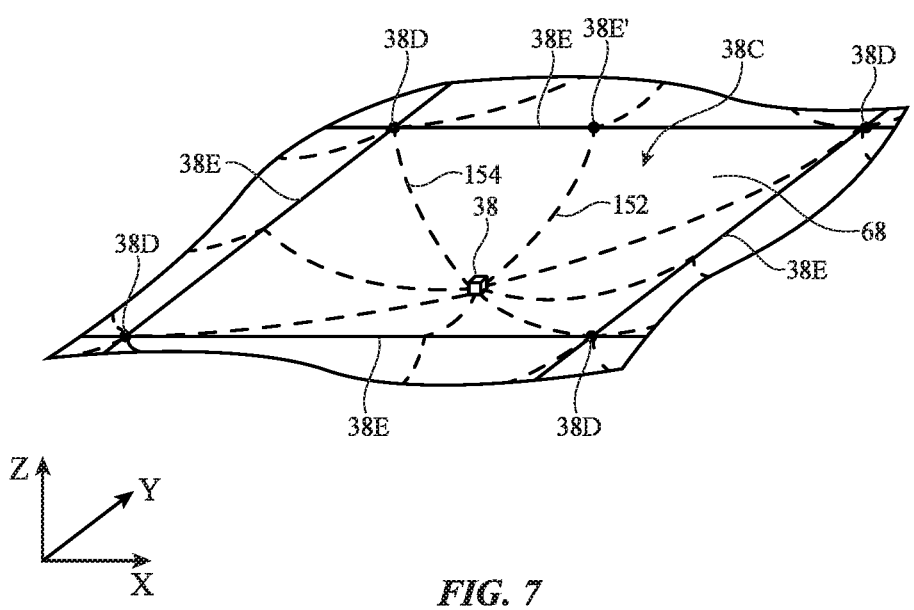
FIGS. 7 and 8 are perspective views of cavity reflector cells for a backlight unit in accordance with embodiments.

An illustrative configuration for a portion of reflector 68 covering an illustrative cell 38C is shown in the perspective view of FIG. 7. As shown in the example of FIG. 7, reflector 68 of cell 38C may be configured so that each of the walls of reflector 68 rises to the same height (see, e.g., height H of FIG. 5) along the peripheral edges 38E of cell 38C with respect to printed circuit 60. As a result, the height (distance between points on edge 38E and printed circuit 60) of reflector 68 along each edge 38E between opposing cell corners 38D is constant and each edge of reflector 68 follows a straight line along a respective straight cell edge 38E. With this configuration, the profile of cell 38C taken along the X or Y dimensions (e.g., edge-to-edge profile 152) will rise to an apex 38E' at a point midway along a cell edge 38E (e.g., at a point that is halfway between the opposing corner endpoints of edge 38E). The cross-sectional profile of cell 38C taken along a diagonal direction (between respective corners 38D) such as corner-to-corner profile 154 will rise to an apex at cell corner 38D. Each cell-edge-to-cell-edge profile apex (e.g., edge midpoints 38E') is located at the same distance (height H of FIG. 5) above printed circuit 60 as each cell-corner-to-cell-corner profile apex (corner points 38D, corresponding to the endpoints of edges 38E).

Figure 8:
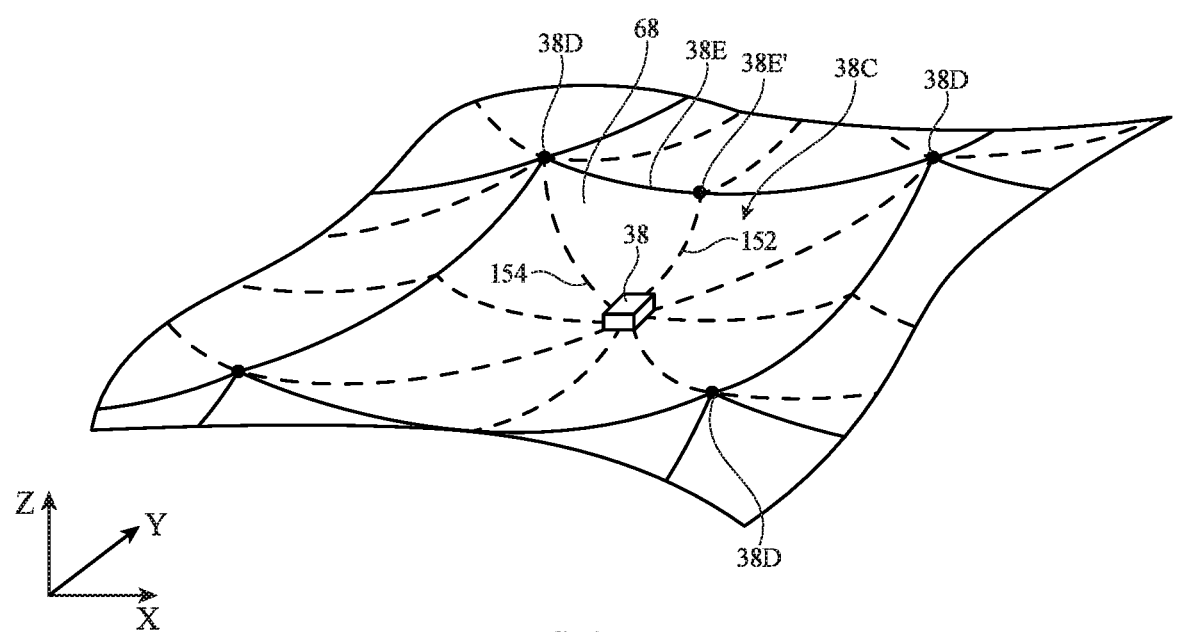

In the example of FIG. 8, reflector 68 of cell 38C is configured to that reflector 68 does not rise to the same height H at each point along edges 38E. Rather, edges 38E have curved shapes that dip towards their midpoints. In particular, each edge 38E is characterized by a maximum height H at corners 38D (the endpoints of curved edge 38E) and is characterized by a minimum height that is less than H at the middle of that edge 38E. The height of reflector 68 along each edge 38E between opposing cell corners 38D is therefore not constant and each edge of reflector 68 follows a drooping curved line along cell edge 38E. The cross-sectional profile of reflector 68 of cell 38C of FIG. 8 taken along the X or Y dimensions (e.g., cell-edge-to-cell-edge profile 152) will rise to an apex 38E' of height less than H at a point midway along a cell edge 38E, whereas the cross-sectional profile of cell 38C taken along a diagonal direction between corners 38D such as corner-to-corner profile 154 will rise to an apex of height H at cell corner 38D (as with reflector 68 of cell 38C of FIG. 7). Each cell-edge-to-cell-edge profile apex (point 38E') is therefore located at a position that is closer to printed circuit 60 than each cell-corner-to-cell profile apex (point 38D).

Figure 9:
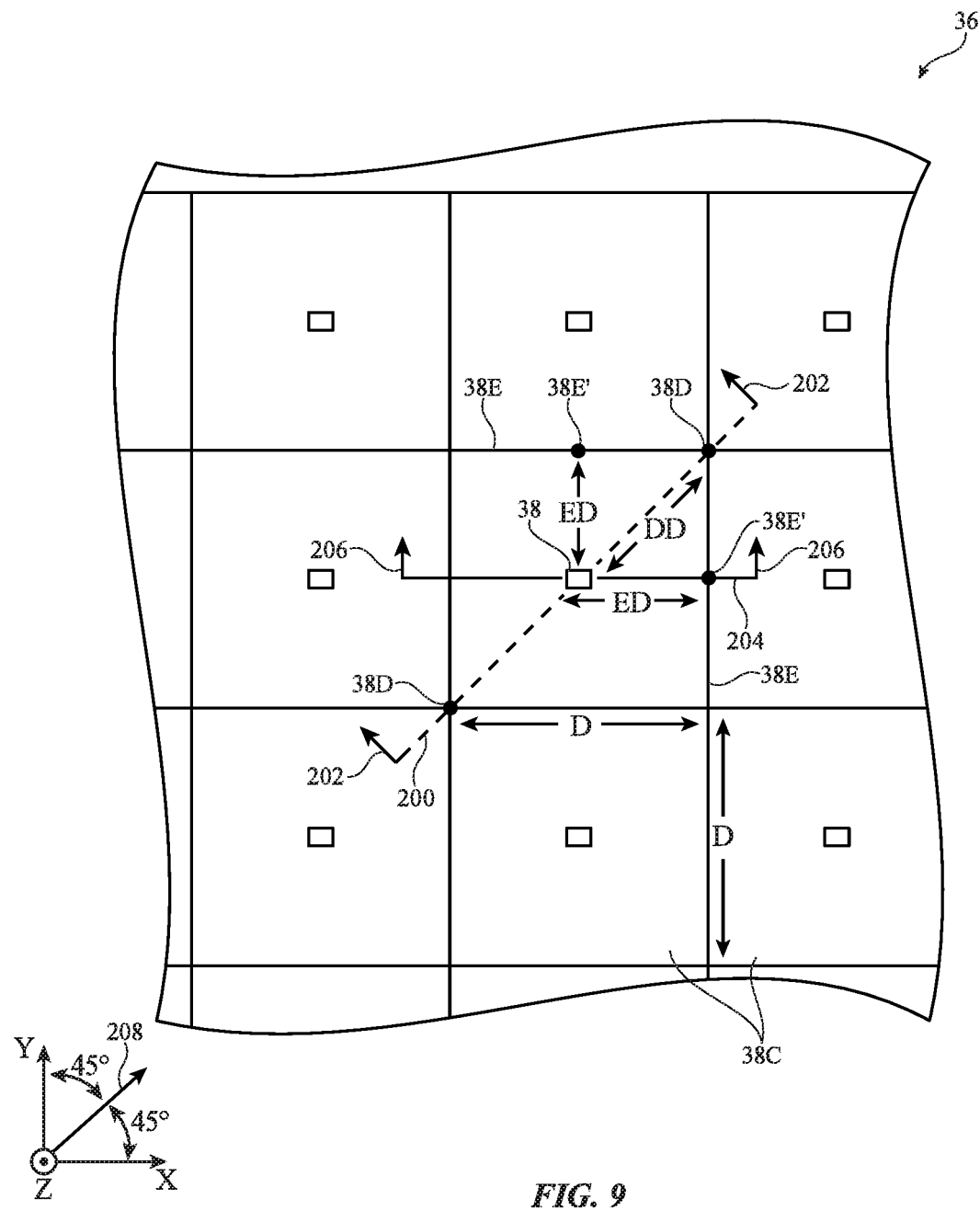
FIG. 9 is a top view of a portion of a backlight unit in accordance with an embodiment.

FIG. 9 is a top view of a portion of array 36. Edge-to-edge cross-sectional profiles for reflector 68 such as profiles 152 of FIGS. 7 and 8 are taken along line 204 and viewed in direction 206. Corner-to-corner cross-sectional profiles for reflector 68 such as profiles 154 of FIGS. 7 and 8 are taken along line 200 and viewed in direction 202. Edge points 38E' are located a distance ED from light-emitting diode 38 in directions X and Y, where ED is equal to one half of cell dimension (cell edge length) D. Corner points 38D are located a distance DD from light-emitting diode 38 along dimension 208, which is defined by an axis oriented at a 45° angle with respect to both the X and Y axes of FIG. 9.

FIGS. 10 and 11 are cross-sectional side views of illustrative reflector configurations for cells 38C in array 36.

The arrangement shown in FIG. 10 corresponds to a configuration of the type shown in FIG. 7 in which edges 38E are straight. Reflector portion 68-1 corresponds to a portion of reflector 68 that runs between light-emitting diode 38 and corner 38D of cell 38C and has a curved profile that matches profile 154 of reflector 68 of cell 38C of FIG. 7. Reflector portion 68-2 corresponds to a portion of reflector 68 that runs between light-emitting diode 38 and edge midpoint 38E' of cell 38C and has a curved profile that matches profile 152 of cell 38C of FIG. 7. As shown in FIG. 10, points 38E' and 38D in this type of arrangement are both located a distance H from the plane in which printed circuit 60 lies.

The arrangement shown in FIG. 11 corresponds to a configuration of the type shown in FIG. 8 in which edges 38E are curved and dip downwards towards printed circuit 60 at locations between corners 38D. Reflector portion 68-1 of FIG. 11 corresponds to a portion of reflector 68 that runs between light-emitting diode 38 and corner 38D of cell 38C and has a curved profile that matches profile 154 of reflector 68 of cell 38C of FIG. 8. Reflector portion 68-2 corresponds to a portion of reflector 68 that runs between light-emitting diode 38 and edge midpoint 38E' of cell 38C and has a curved profile that matches profile 152 of cell 38C of FIG. 8. Corner points 38D of cell 38C in this type of arrangement are located at a distance H from the plane in which printed circuit 60 lies, whereas edge midpoint such as points 38E' are located at a distance H' that is less than H from the plane in which printed circuit 60 lies.

If desired, reflector 68 may have a Fresnel shape in which reflector 68 has a series of concentric rings 68-3 each of which has a profile that matches a corresponding portion of a profile such as profile 152 or 154. The use of a Fresnel reflector structure (reflective Fresnel lens structure) for reflector 68 allows the distance between printed circuit 60 and layer 96 to be minimized, because the maximum separation between reflector 68 and printed circuit 60 in this type of arrangement can be less than the maximum separation between reflector 68 and printed circuit 60 in configurations of the types shown in FIGS. 7 and 8.

Figure 12:
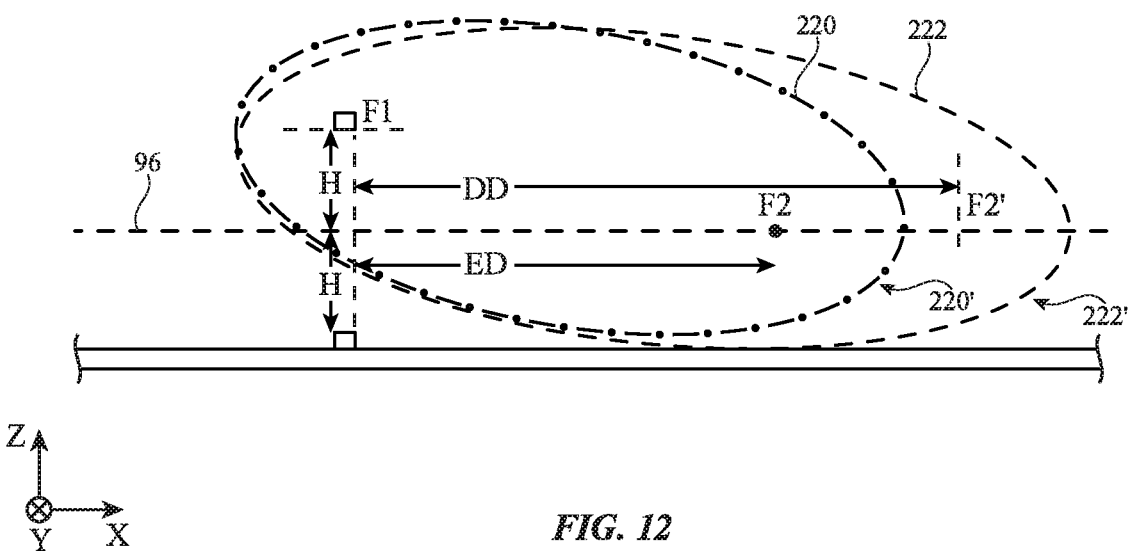
FIG. 12 is a cross-sectional diagram of an illustrative cavity reflector that includes a portion with an elliptical profile in accordance with an embodiment.
Figure 13:
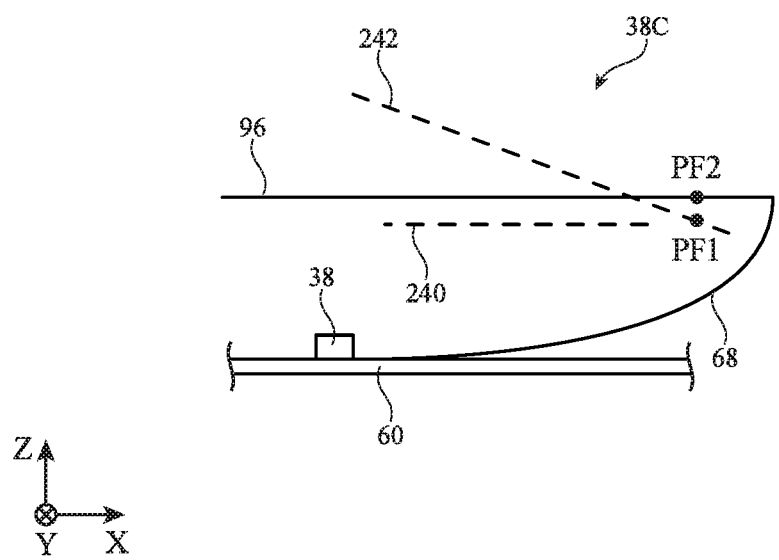
FIG. 13 is a cross-sectional diagram of an illustrative cavity reflector that includes a portion with a parabolic profile in accordance with an embodiment.
Figure 14:
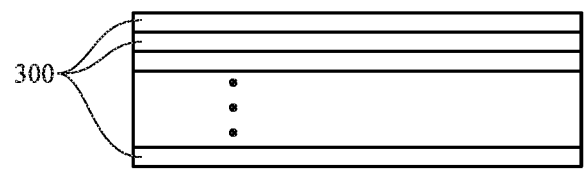
FIG. 14 is a cross-sectional side view of an illustrative stack of dielectric layers such as dielectric layers of alternating refractive index forming a thin-film interference filter in accordance with an embodiment.

FIGS. 12 and 13 show how the cross-sectional profiles of reflector 68 may have elliptical or parabolic portions to enhance the homogeneity of emitted light 44.

The use of elliptical shapes for portions of the cross-sectional profiles of reflector 68 in cells 38C is shown in FIG. 12. As shown in FIG. 12, light-emitting diode 38 is associated with a virtual image at location F1 (the location of the reflection of light-emitting diode 38 in layer 96). This location may form one of two foci for an ellipse that is used in defining a portion of the profile for reflector 68. Two illustrative ellipses are shown in the example of FIG. 12. Ellipse 220 has first focus F1 and second focus F2. Ellipse 222 has first focus F1 and second focus F2'. Foci F2 and F2' may lie within the plane of layer 96. Portion 220' of ellipse 220 may form an edge-to-edge profile for reflector 68 such as profile 152 of FIGS. 7 and 8. Portion 222' of ellipse 222 may form an edge-to-edge profile for reflector 68 such as profile 154 of FIGS. 7 and 8.

The use of parabolic shapes for portions of the cross-sectional profiles of reflector 68 in cells 38C is shown in FIG. 13. As shown in FIG. 13, reflector 68 may have cross-sectional profiles (e.g., an edge-to-edge cross-sectional profile and/or a corner-to-corner cross-sectional profile) that include parabolic portions. Point PF1 may be associated with a focus of a parabola that defines the shape of part of a profile for reflector 68. The axis of symmetry for the parabola may be oriented at a non-zero angle with respect to the X-axis (as illustrated by axis 242) or may have other suitable orientations (see, e.g., horizontal axis 240). If desired, the axis of symmetry for the parabola and the focus of the parabola may have other suitable locations (see, e.g., focus PF2).

Ray trace models have demonstrated that elliptical and parabolic profiles for reflector 68 can help distribute light from light-emitting diode 38 uniformly over the surface of each cell 38C, so that each cell 38C emits uniform backlight illumination 44. If desired, reflector 68 may have other shapes. The use of elliptical and parabolic profiles for portions of reflector 68 is illustrative.

Illustrative layers that may be incorporated into backlight 42 are shown in FIGS. 14, 15, 16, and 17.

Optical layers in backlight 42 such as optical films 26 may include thin-film interference filter layers. These layers may be formed from a stack of inorganic and/or organic dielectric layers of alternating index of refraction (see, e.g., the dielectric stack of layers 300 of FIG. 14). Thin-film interference filters may form broadband (white light) reflectors (sometimes referred to as mirrors or partial mirrors) and/or may form filters that reflect some colors of light more than others (e.g., to form a filter that has a non-flat visible light reflection spectrum). Thin-film interference filters may be configured to transmit light that is not reflected (e.g., so that light transmission is high at wavelengths that are not reflected). Dielectric stacks such as the stack of layer 300 of FIG. 14 may be formed on polymer or glass substrates and/or may be combined with layers of material that perform other functions (e.g., as thin-film interference filter coating layers).

Figure 15:
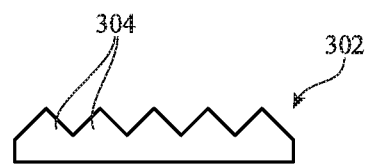
FIG. 15 is a cross-sectional side view of an illustrative light-collimating layer such as a prism film in accordance with an embodiment.

If desired, brightness enhancement films (sometimes referred to as prism films, light-collimating layers, or light-collimating prism layers) may be used in collimating light 44. FIG. 15 is a cross-sectional side view of an illustrative prism film. As shown in FIG. 15, prism film 302 has a series of parallel ridges 304 that extend into the page and that have triangular cross-sectional shapes. Ridges 304 may face upwards (outwardly) towards the viewer to help collimate light 44 towards the viewer.

Figure 16:
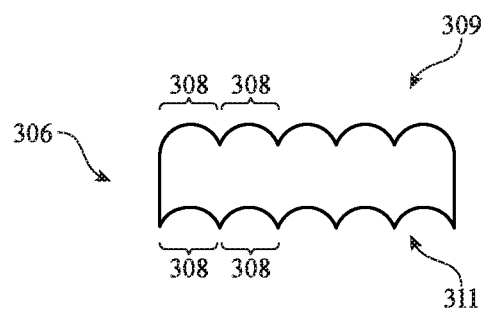
FIG. 16 is a cross-sectional side view of an illustrative microlens array layer in accordance with an embodiment.
Figure 17:
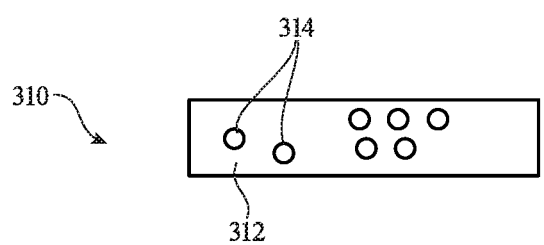
FIG. 17 is a cross-sectional side view of an illustrative diffuser layer in accordance with an embodiment.

Microlens array layers such as illustrative microlens array layer 306 of FIG. 16 may be used to spread and homogenize light 44. Layer 306 may be relatively thin so as not to overly increase the thickness of display 14. For example, layer 306 may be 5-100 microns thick, at least 10 microns thick, or less than 150 microns thick. In the example of FIG. 16, upper (outwardly facing) surface 309 of layer 306 has an array of convex lenses such as convex microlenses 308 and lower (inwardly facing) surface 311 of layer 306 has an array of concave lenses such as concave microlenses 308. In general, either of the surfaces of layer 306 may be planar, either of the surfaces of layer 306 may have convex lenses, and/or either of the surfaces of layer 306 may have concave lenses. The configuration of FIG. 16 is merely illustrative. Microlenses 308 may have lateral dimensions of about 15-25 microns, at least 10 microns, less than 30 microns, or other suitable lateral dimensions and may have heights of about 3-20 microns. A non-uniform pattern may be used for microlenses 308 to reduce Moiré effects.

Optical layers 26 may include one or more light-diffuser layers. In the illustrative configuration of FIG. 17, light-diffuser layer 310, which may sometimes be referred to as a diffuser or diffuser layer, has a polymer substrate such as substrate 312 in which light-scattering particles 314 (e.g., titanium oxide particles) have been embedded. Other diffuser configurations may be used, if desired.

Figure 18:
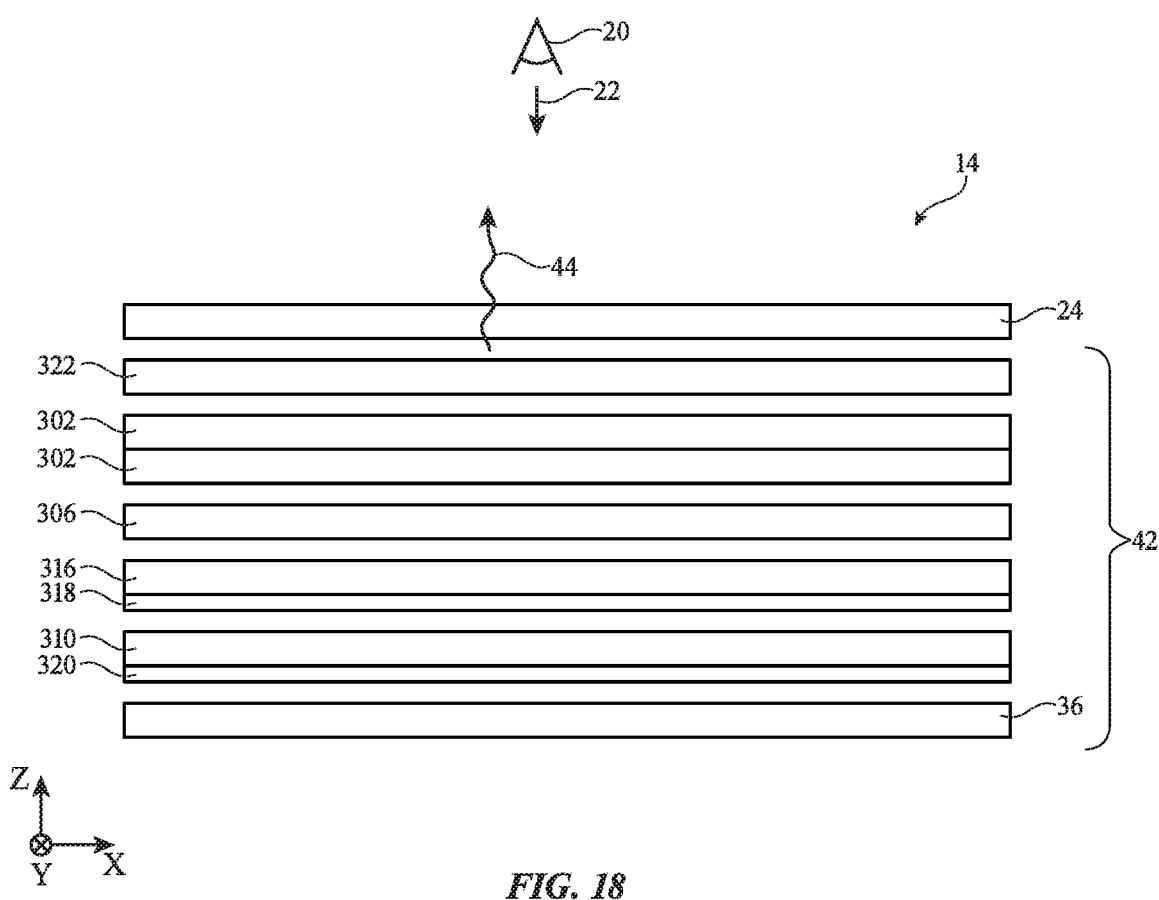
FIG. 18 is a cross-sectional side view of an illustrative display in accordance with an embodiment.

An illustrative configuration for display 14 that incorporates one or more layers such as these into backlight 42 is shown in FIG. 18. As shown in the illustrative configuration of FIG. 18, backlight unit 42 may include a light source such as light-emitting diode array 36. Light from array 36 (e.g., blue light from blue light-emitting diodes in array 36) passes upwards in the +Z direction through the layers stacked on top of array 36 and exits backlight unit 42 as backlight illumination 44 for pixel array 24.

Backlight 42 of display 14 of FIG. 18 may have a diffuser such as diffuser layer 310. Diffuser layer 310 may be located above array 36. The lower surface of diffuser layer 310 may be coated with a thin-film interference filter 320. Filter 320 may be formed from a stack of dielectric layers of alternating refractive index (see, e.g., the dielectric stack of FIG. 14) that has been configured to be partially transmitting and partially reflecting to blue light. For example, the reflectivity of filter 320 (which may sometimes be referred to as a blue-light reflecting filter or partially reflecting filter) at blue wavelengths may be between 50% and 90%, at least 60%, less than 80%, or other suitable value (e.g., the filter may be a partially transmitting blue-reflecting filter that is partially transparent to blue light). At red and green wavelengths, this filter may have more or less reflectivity than at blue wavelengths.

A photoluminescent layer such as yellow phosphor layer 316 may be used to convert at least some of the light from the light-emitting diodes of array 36 (e.g., at least some of the blue light from blue light-emitting diodes in array 36) into red and green light, thereby allowing layer 316 to emit white light backlight illumination 44. Some of the red and green light may be emitted downwards. To prevent lateral leakage of red and green light, a thin-film interference filter such as filter 318 may be formed on the lower surface of layer 316. Filter 318 may be formed from a dielectric stack (e.g., dielectric stack 300 of FIG. 14) that has been configured to pass blue light while reflecting red and green light (e.g., filter 318 may be a blue-transmitting-and-red-and-green-reflecting thin-film interference filter).

Microlens array layer 306 (FIG. 16) may be located above layer 316 and may be used to spread out light 44 to prevent hotspots.

Light 44 may be collimating toward viewer 20 using one or more prism films 302. In the example of FIG. 18, display 14 has two prism films 302. The prisms of films 302 may be oriented perpendicularly to each other. For example if the prisms of the lower prism film are parallel to the X axis, the prisms of the upper prism film may be parallel to the Y axis. Reflective polarizer 322 may be located above prism films 302 to help recycle light and thereby enhance backlight efficiency. Reflective polarizer 322 may pass light that is linearly polarized along a given axis while reflecting (recycling) orthogonally polarized light.

In accordance with an embodiment, a display is provided that includes a plurality of pixels and a backlight configured to produce backlight illumination for the plurality of pixels, the backlight includes light sources that are configured to emit light and that are arranged in a plurality of respective cells and a reflector that reflects the light through the plurality of pixels from the light sources, the reflector has a cross-sectional profile in each cell with a portion that is selected from the group consisting of: a parabolic portion and an elliptical portion.

In accordance with another embodiment, the pixels include an array of pixels and the light sources include a two-dimensional array of the light sources that are arranged in a two-dimensional array of the respective cells.

In accordance with another embodiment, each light source has at least one light-emitting diode.

In accordance with another embodiment, the display includes a light diffuser layer interposed between the array of light-emitting diodes and the array of pixels and a partially reflective layer interposed between the light diffuser layer and the array of light-emitting diodes.

In accordance with another embodiment, the partially reflective layer includes a partially reflective layer selected from the group consisting of: a thin-film interference filter having an angularly dependent light transmission characteristic, a cholesteric liquid crystal layer, and a stack of polymer films of alternating refractive index.

In accordance with another embodiment, the display includes a printed circuit, the light-emitting diodes are mounted to the printed circuit, within each cell the reflector has four straight edges surrounding a respective one of the light-emitting diodes, and each point along each of the four edges is separated by a common distance from the printed circuit.

In accordance with another embodiment, the display includes a printed circuit, the light-emitting diodes are mounted to the printed circuit, within each cell the reflector has four corners and four curved edges each of which extends between a respective pair of the four corners, each of the four curved edges has endpoints separated from the printed circuit by a first distance and a midpoint separated from the printed circuit by a second distance that is less than the first distance.

In accordance with another embodiment, the display includes a light diffuser layer interposed between the array of pixels and the array of light-emitting diodes, the partially reflective layer includes a coating on the light-diffuser layer, the reflector includes a reflector selected from the group consisting of: a glossy white reflector, a diffusively reflective white reflector, a specularly reflective white reflector, a stack of thin-film dielectric layers forming a thin-film interference mirror, a cholesteric liquid crystal layer, and a stack of polymer films of alternating refractive index.

In accordance with another embodiment, the reflector includes a reflector selected from the group consisting of: a glossy white reflector, a diffusively reflective white reflector, or a specularly reflective white reflector.

In accordance with another embodiment, the reflector includes a reflector selected from the group consisting of: a stack of thin-film dielectric layers forming a thin-film interference mirror, a cholesteric liquid crystal layer, and a stack of polymer films of alternating refractive index.

In accordance with another embodiment, the light-emitting diodes include blue light-emitting diodes and the display includes a partially reflective layer interposed between the light-emitting diodes and the array of pixels.

In accordance with another embodiment, each light source includes at least two light-emitting diodes.

In accordance with an embodiment, a display is provided that includes an array of pixels and a backlight configured to produce backlight illumination for the array of pixels, the backlight includes a two-dimensional array of light-emitting diode cells each of which includes at least one light-emitting diode that is configured to emit light and a reflector that reflects light through the array of pixels from the light-emitting diodes, the reflector has a cross-sectional profile in each cell with a portion that is parabolic.

In accordance with another embodiment, the display includes a light diffuser layer interposed between the array of pixels and the array of light-emitting diodes, the light-emitting diodes are configured to emit blue light and a coating on the light-diffuser layer that forms a thin-film interference filter that has an angularly dependent transmission.

In accordance with another embodiment, the light-emitting diodes are configured to emit blue light.

In accordance with another embodiment, the display includes a printed circuit, the light-emitting diodes are mounted to the printed circuit, within each cell the reflector has four corners and has four straight edges extending between the corners, and each point along each of the four straight edges is separated by a common distance from the printed circuit.

In accordance with another embodiment, the display includes a printed circuit, the light-emitting diodes are mounted to the printed circuit, within each cell the reflector has four corners and four curved edges each of which extends between a respective pair of the four corners, each of the four curved edges has endpoints separated from the printed circuit by a first distance and a midpoint separated from the printed circuit by a second distance that is less than the first distance.

In accordance with another embodiment, the reflector includes a layer selected from the group consisting of: a layer having a stack of dielectric layers forming a thin-film interference mirror and a glossy white layer.

In accordance with another embodiment, the light-emitting diodes include white light-emitting diodes.

In accordance with an embodiment, a display is provided that includes an array of pixels and a backlight configured to produce backlight illumination for the array of pixels, the backlight includes a two-dimensional array of light-emitting diodes that are configured to emit light and that are arranged in a two-dimensional array of respective cells and a reflector that reflects light through the array of pixels from the light-emitting diodes, the reflector has a cross-sectional profile in each cell with a portion that is elliptical.

In accordance with another embodiment, the light-emitting diodes include blue light-emitting diodes, the display includes a light diffuser layer interposed between the array of pixels and the array of light-emitting diodes and a coating on the light-diffuser layer that forms a thin-film interference filter that has an angularly dependent transmission, the reflector includes a layer selected from the group consisting of: a layer having a stack of dielectric layers forming a thin-film interference mirror and a glossy white layer.

In accordance with an embodiment, a display is provided that includes pixels configured to display images and a backlight configured to produce backlight illumination for the pixels, the backlight includes a two-dimensional array of light-emitting diode cells each of which includes at least one light-emitting diode that is configured to emit light, a reflector with a curved cross-sectional profile that reflects light through the array of pixels from the light-emitting diodes and a microlens array layer between the pixels and the two-dimensional array of light-emitting diode cells.

In accordance with another embodiment, the backlight includes a phosphor layer between the microlens array layer and the two-dimensional array of light-emitting diode cells, a diffuser layer between the phosphor layer and the two-dimensional array of light-emitting diode cells, and a first thin-film interference filter on the diffuser layer and a second thin-film interference filter on the phosphor layer.

In accordance with another embodiment, the backlight includes a diffuser layer between the phosphor layer and the two-dimensional array of light-emitting diode cells.

In accordance with another embodiment, the backlight includes a first thin-film interference filter on the diffuser layer and a second thin-film interference filter on the phosphor layer.

In accordance with an embodiment, the light-emitting diodes include blue light-emitting diodes configured to emit blue light, the first thin-film interference filter is configured to partially transmit the blue light, the second thin-film interference filter is configured to transmit the blue light and reflect red and green light generated in the phosphor layer in response to the blue light, and the backlight includes first and second prism films between the pixels and the microlens array layer and a reflective polarizer between the second prism film and the pixels.

In accordance with another embodiment, the first thin-film interference filter is configured to partially transmit the blue light.

In accordance with another embodiment, the second thin-film interference filter is configured to transmit the blue light and reflect red and green light generated in the phosphor layer in response to the blue light.

In accordance with another embodiment, the backlight includes first and second prism films between the pixels and the microlens array layer.

In accordance with another embodiment, the backlight includes a reflective polarizer between the second prism film and the pixels.

The foregoing is merely illustrative and various modifications can be made to the described embodiments. The foregoing embodiments may be implemented individually or in any combination.

What is claimed is:

1. A display, comprising:
pixels configured to display images; and
a backlight configured to produce backlight illumination for the pixels, wherein the backlight comprises:
a two-dimensional array of light-emitting diode cells each of which includes at least one light-emitting diode that is configured to emit light, wherein the two-dimensional array of light-emitting diode cells is formed in a plane;
a reflector with a curved cross-sectional profile having a selected one of a parabolic shape and an elliptical shape, wherein the reflector reflects light through the array of pixels from the light-emitting diodes, wherein the cross-sectional profile is defined by an axis of symmetry that is substantially parallel to the plane so that the more of the light from the light-emitting diodes is directed toward the edges of the cells than toward the centers of the cells;
a microlens array layer between the pixels and the two-dimensional array of light-emitting diode cells;
a light diffuser layer between the two-dimensional array of light-emitting diode cells and the microlens array layer; and
a phosphor layer, wherein the light diffuser layer is interposed between the phosphor layer and the two-dimensional array of light-emitting diode cells.

2. The display defined in claim 1 wherein the backlight further comprises a first thin-film interference filter on the diffuser layer and a second thin-film interference filter on the phosphor layer.

3. The display defined in claim 2 wherein the light-emitting diodes comprise blue light-emitting diodes configured to emit blue light.

4. The display defined in claim 3 wherein the first thin-film interference filter is configured to partially transmit the blue light.

5. The display defined in claim 4 wherein the second thin-film interference filter is configured to transmit the blue light and reflect red and green light generated in the phosphor layer in response to the blue light.

6. The display defined in claim 5 wherein the backlight further comprises first and second prism films between the pixels and the microlens array layer.

7. The display defined in claim 6 wherein the backlight further comprises a reflective polarizer between the second prism film and the pixels.

8. A display, comprising:
a plurality of pixels;
a backlight configured to produce backlight illumination for the plurality of pixels, wherein the backlight comprises:
an array of light sources that are configured to emit light and that are arranged in a plurality of respective cells, wherein the array of light sources is formed in a plane; and
a reflector that reflects the light through the plurality of pixels from the light sources, wherein the reflector has a plurality of cross-sectional profiles in each cell, wherein each cross-sectional profile has a portion that is selected from the group consisting of: a parabolic portion and an elliptical portion, wherein each of the cross-sectional profiles is defined by an axis of symmetry that is oriented substantially parallel to the plane so that more of the light from the light sources is directed toward edges of the cells than toward centers of the cells;
a light diffuser layer interposed between the light sources and the array plurality of pixels;
an angularly dependent filter interposed between the light diffuser layer and the light sources; and
a layer of photoluminescent material, wherein the light diffuser layer is interposed between the layer of photoluminescent material and the light sources.

9. The display defined in claim 8 wherein the light sources comprise a two-dimensional array of the light sources that are arranged in a two-dimensional array of the respective cells.

10. The display defined in claim 9 wherein each light source has at least one light-emitting diode.

11. The display defined in claim 10 wherein the angularly dependent filter is a thin-film interference filter having an angularly dependent light transmission characteristic.

12. The display defined in claim 11 wherein the angularly dependent filter comprises a coating on the light diffuser layer.

13. The display defined in claim 12 wherein the reflector comprises a reflector selected from the group consisting of: a glossy white reflector, a diffusively reflective white reflector, or a specularly reflective white reflector.

14. The display defined in claim 12 wherein the reflector comprises a reflector selected from the group consisting of: a stack of thin-film dielectric layers forming a thin-film interference mirror, a cholesteric liquid crystal layer, and a stack of polymer films of alternating refractive index.

15. The display defined in claim 11 further comprising a printed circuit, wherein the light-emitting diodes are mounted to the printed circuit, wherein within each cell, the reflector has four straight edges surrounding a respective one of the light-emitting diodes, and wherein each point along each of the four edges is separated by a common distance from the printed circuit.

16. The display defined in claim 11 further comprising a printed circuit, wherein the light-emitting diodes are mounted to the printed circuit, wherein within each cell, the reflector has four corners and four curved edges each of which extends between a respective pair of the four corners, wherein each of the four curved edges has endpoints separated from the printed circuit by a first distance and a midpoint separated from the printed circuit by a second distance that is less than the first distance.

17. The display defined in claim 10 wherein the light-emitting diodes comprise blue light-emitting diodes.

18. The display defined in claim 9 wherein each light source comprises at least two light-emitting diodes.

19. A display, comprising:
an array of pixels; and
a backlight configured to produce backlight illumination for the array of pixels, wherein the backlight comprises:
a reflector forming a two-dimensional array of light-emitting diode cells in a plane, wherein each of the light-emitting diode cells includes at least one light-emitting diode that is configured to emit light, wherein the reflector reflects light through the array of pixels from the light-emitting diodes, wherein the reflector has at least three cross-sectional profiles in each cell, each of which has a portion that is parabolic, wherein each of the parabolic cross-sectional profiles is defined by an axis of symmetry that is oriented substantially parallel to the plane so that more of the light from the light-emitting diodes is directed toward edges of the light-emitting diode cells than toward centers of the light-emitting diode cells;
a light diffuser layer interposed between the array of pixels and the array of light-emitting diodes; and
a coating on the light-diffuser layer that forms a thin-film interference filter that has an angularly dependent transmission.

20. The display defined in claim 19 wherein the light-emitting diodes are configured to emit blue light.

21. The display defined in claim 20 further comprising a printed circuit, wherein the light-emitting diodes are mounted to the printed circuit, wherein within each cell the reflector has four corners and has four straight edges extending between the corners, and wherein each point along each of the four straight edges is separated by a common distance from the printed circuit.

22. The display defined in claim 20 further comprising a printed circuit, wherein the light-emitting diodes are mounted to the printed circuit, wherein within each cell the reflector has four corners and four curved edges each of which extends between a respective pair of the four corners, wherein each of the four curved edges has endpoints separated from the printed circuit by a first distance and a midpoint separated from the printed circuit by a second distance that is less than the first distance.

23. The display defined in claim 20 wherein the reflector comprises a layer selected from the group consisting of: a layer having a stack of dielectric layers forming a thin-film interference mirror and a glossy white layer.

24. The display defined in claim 19 wherein the light-emitting diodes comprise white light-emitting diodes.

25. A display, comprising:
an array of pixels;
a backlight configured to produce backlight illumination for the array of pixels, wherein the backlight comprises:
a two-dimensional array of light-emitting diodes that are configured to emit light and that are arranged in a two-dimensional array of respective cells, wherein the two-dimensional array of light-emitting diodes is formed in a plane; and
a reflector that reflects light through the array of pixels from the light-emitting diodes, wherein the reflector has cross-sectional profiles in each cell, including edge-to-edge cross-sectional profiles and corner-to-corner cross-sectional profiles, wherein the edge-to-edge cross-sectional profiles have a first elliptical shape and the corner-to-corner cross-sectional profiles have a second elliptical shape, wherein each of the cross-sectional profiles is defined by an axis of symmetry that is substantially parallel to the plane so that more of the light from the light-emitting diodes is directed toward edges of the cells than toward centers of the cells, and wherein the first elliptical shape is different from the second elliptical shape;
a light diffuser layer interposed between the array of pixels and the array of light-emitting diodes; and
a coating on the light-diffuser layer that forms a thin-film interference filter that has an angularly dependent transmission, wherein the reflector comprises a layer selected from the group consisting of: a layer having a stack of dielectric layers forming a thin-film interference mirror and a glossy white layer.

* * * * *